Figure 1:
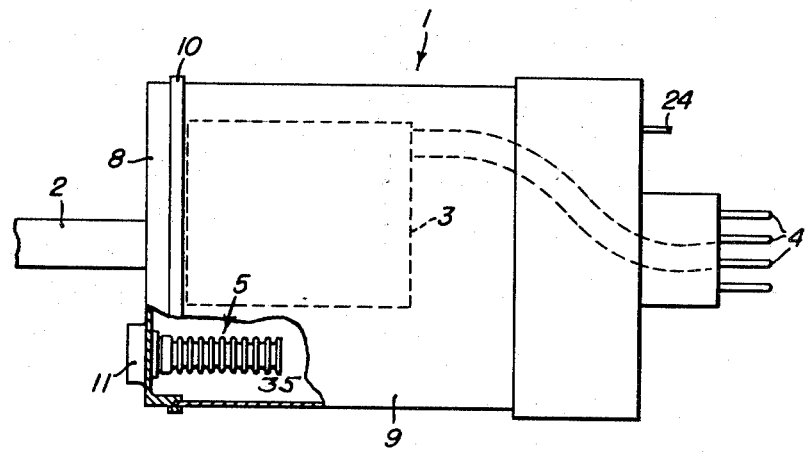

May 3, 1955

R. D. WAITE 2,707,398

BLOW-OUT DEVICE FOR HERMETICALLY SEALED
SYNCHRO-TRANSMITTING INSTRUMENT

Filed June 27, 1952

INVENTOR.
RALPH D. WAITE
BY
Bruno C. Lechler
ATTORNEY

United States Patent Office 2,707,398
Patented May 3, 1955

2,707,398

BLOW-OUT DEVICE FOR HERMETICALLY SEALED SYNCHRO-TRANSMITTING INSTRUMENT

Ralph D. Waite, Sellersville, Pa., assignor to American Machine and Metals, Inc., New York, N. Y., a corporation of Delaware Application June 27, 1952, Serial No. 295,973

3 Claims. (Cl. 73—416)

This invention relates to a safety device which will allow the escape of fluid from an instrument or gauge as the pressure therein rises above a preset value and particularly to a pressure blowout device for use in a hermetically sealed instrument housing having means therein subject to pressure, said means being subject to possible sudden rises in pressure. While not limited thereto, the invention is adapted for use in connection with a device such as the Differential Gauge and Synchro-Transmitter, Sealed Case, covered by the application of Ralph D. Waite and Philip W. Harland, filed September 12, 1951, and carrying Serial No. 246,278.

In such an instrument, the hermetically sealed case is filled with an inert gas. As the ambient temperature changes, the pressure of the inert gas will change, rising or falling above or below its initial pressure. The synchro-transmitting instrument is actuated by pressure responsive devices such as Bourdon tubes, capsules, or similar devices responsive to pressure changes, supported in the hermetically sealed housing and connected by passages extending through the wall of the housing to the sources of pressure which the instrument is to measure.

Since a Bourdon tube is thin-walled and subject to constant flexure, it is subject to rupture either by the fatigue of the material or by a rise of pressure above the normal range of the instrument. In that event, the instrument housing fills suddenly with the fluid under pressure which may be, for example, hot oil or a poisonous gas. If no blow-out safety device is provided, the housing is apt to explode causing damage and injury in its vicinity.

While blow-out devices are old in instruments and it is not new to provide a bellows which is collapsed by a rise of pressure within the housing and which, in collapsing, is perforated in a stationary cutter, such known devices are not applicable for use in a housing which is hermetically sealed and whose contents are subject to normal pressure changes to which the blow-out device is not responsive, nor are they applicable for use in locations where the device is subject to deterioration by outside elements during the possibly long interval before the device is called upon to act.

In the past, most blow-out safety devices for gauges or instruments have been integral units which could be periodically easily removed from the container for cleaning or replacement. Although this is possible when a hermetic seal is not required, in many instances such as the present, a hermetic seal is necessary.

The invention, therefore, contemplates providing a bellows, inside a container, sealed hermetically at one end to the wall of the container, and closed at the other end by a thin metal disc, which may be of silver. This metal disc is soldered to the bellows to provide a hermetically sealed joint. Means are provided to rupture this disc when high pressure is released in the casing.

One of the features of the invention is that the blow-out safety device need never be removed, cleaned or inspected.

It is desirable in many applications to make this bellows very small. In cases where the inside of the bellows would be exposed to moisture and corrosive elements such as salt spray, a second feature of the invention is used. This is the use of a thin gold disc, less than .001 inch thick and substantially the same diameter as that of the bellows. This disc is seated on a shoulder on the outside wall of the container and is non-hermetically sealed by clamping it with a threaded retainer. The disc is .001 inch thick or less so that it will be ruptured by the pressure that caused the silver disc to rupture. The only metal that is non-corrosive, and which can be rolled into such a thin sheet, is gold.

More especially, the invention relates to a blow-out safety device in which the movable portions of the device itself are inaccessibly housed within the instrument housing to be protected. When the invention is used in an ambient medium which should not enter the housing because the medium will either corrode the inaccessible movable parts or deposit thereon foreign matter which prevents their functioning, means are provided to keep such a medium out of the device.

The invention provides a means to hermetically seal an instrument housing and yet give a positive opening for the discharge of fluid if fluid under high pressure should be released by the measuring devices within the housing, such as due to rupture of the measuring devices or some abnormal condition.

A principal object of the invention is to provide a hermetically sealed instrument or gauge casing, which will withstand the expansion and contraction of an inert gas filling the casing, but which has a diaphragm which will be punctured to permit escape of the fluid in the housing should there be a sudden dangerous rise of pressure in the casing.

A further object is to provide a hermetically sealed instrument casing, rupturing means outside the sealed-off area but located in a second sealed area, and a diaphragm between the two sealed areas and a membrane between the second sealed area and the outer atmosphere, both of which are adapted to be ruptured by a sudden or dangerous pressure rise in the instrument casing.

Figure 2:
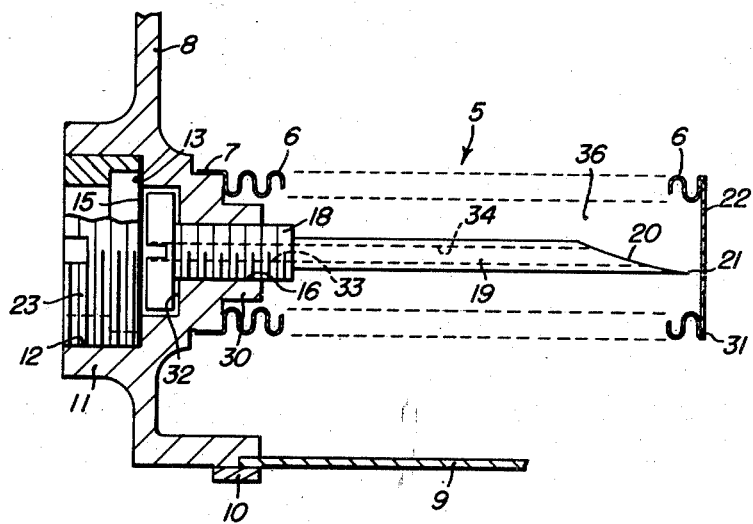

In the drawings:

Fig. 1 is an elevation, partly in section, actual size of an instrument embodying the invention. Fig. 2 shows the invention in section, drawn to a greatly enlarged scale.

In Fig. 1, 1 indicates generally the instrument housing into which a pressure connection 2 carries fluid under presure to a responsive element in the casing such as a Bourdon tube or the like. This pressure actuates a signal transmitting device 3 which produces an electric signal for transmission through connection 4 as described in the aforementioned copending application.

The blow-out device which forms the subject of the invention is indicated generally at 5 in Fig. 1.

The blow-out device 5 is carried by a cap 8 which is sealed hermetically to the casing 9 by means of a strip 10 soldered in place.

As shown in Fig. 2, the cap 8 has an inwardly extending boss 30 formed with one or more shoulders, the boss having an opening therethrough. Soldered to boss 30 is the flange 7 of an inwardly extending bellows 6. This bellows is closed at its inner end by a diaphragm 22 of soft metal such as silver, soldered at 31.

The opening extending through boss 30 is so constructed as to form a first inner shoulder 32 and a second inner shoulder 13, the second inner shoulder being of larger diameter than the first. The part of the opening extending inwardly from inner shoulder 32 is threaded as shown at 16 and the part of the opening extending outwardly from shoulder 13 is threaded as at 12.

Located so as to closely engage the threads 16 is threaded plug 18, to the inner end of which is secured needle 19, preferably made of steel. The needle is cut as at 20 so as to provide a sharp point at 21.

Needle 19 is hollow, having a bore 34 therethrough aligned with axial hole 33 in the plug 18. The plug is constructed so as to be rotated, such as by a screwdriver, in order to position the needle 19 axially with respect to the boss 30. Because of this provision, the device can be set so as to function at a desired pressure within a certain range. As can be observed, as the point of the needle is moved closer to diaphragm 22, the less pressure increase inside the container 9 would be necessary to compress the bellows sufficiently for the diaphragm to be brought into contact with and punctured by the point of needle 19.

In the operation of the device as thus far described, normal fluctuation in temperature outside of transmitter 1 will not cause enough difference in the volume of the inert gas inside of the container 9 to actuate the blow-out device. If, however, the Bourdon tube in the instrument or transmitter ruptures for some reason, a high pressure fluid is released inside of casing 9. The pressure created by this fluid compresses bellows 6, so that diaphragm 22 is pushed against point 21 which will pierce the diaphragm. The high pressure fluid can thus escape through 34, 33 to the outside in a direction away from any individuals or instruments. If the blow-out device were not provided, the high pressure would cause casing 9 to blow up endangering the individuals and instruments.

Since the inside of bellows 6 is exposed to the ambient air, it is subject to corrosion by moisture, to foreign elements such as salt spray if a device embodying the invention is employed in a seaplane. Since the transmitter is hermetically sealed, it can not be readily taken apart to clean the blow-out device. Also, the bellows 6 is so small it cannot be easily cleaned.

Therefore, the invention provides a second diaphragm 15 clamped on shoulder 13 by means of a retaining ring 23 screwed in the threaded bore 12 in boss 11.

This diaphragm 15 must be of a non-corrosive material, and it must be thin enough to be ruptured by the pressure inside of 6 when diaphragm 22 is pierced by 21. It has been found that a diaphram must be less than .001 inch thick to rupture at the desired pressure. Only gold can be rolled this thin, and is non-corrosive. Since it is so thin, it cannot be soldered directly to the casing, but is clamped in place to provide a closure.

Thus it is seen that there is a closed space 35 in the container, and a closed space 36 in bellows 6 extending through 34, 33 to the inner surface of diaphragm 15.

In the operation of this device, after the housing 1 has been assembled with the bellows 6 and needle assembly 19 and the protecting disc 15 placed, and the strip 10 has been sealed in place, the housing is evacuated through the tube 24 and inert gas admitted and the tube sealed.

Devices of this general type may be used in the cabin of a plane, out on the wings exposed to moisture, or they may be used even in sub-surface operations. The inert gas protects the instruments against deterioration and the protecting diaphragm 15 prevent the admission of foreign matter or moisture into the bellows 6.

The details of construction can be varied and the principles applied to other instruments without departing from the spirit of the invention as defined by the appended claims.

What I claim is:

1. In an instrument having pressure responsive means, the combination comprising a hermetically sealed casing within which said pressure responsive means is housed, said casing having an opening therein, bellows with one end sealed around said opening, the opposite end of the bellows extending inwardly and being sealed by a diaphragm, a plug carried in said opening and having a needle integral therewith extending inwardly with its point in proximity to said diaphragm, a bore extending through said needle and plug to the atmosphere, so that upon leakage or rupture of said pressure responsive means said bellows will be contracted and said diaphragm pierced by said needle, and a second thin diaphragm across said opening located outwardly of said plug to shield the same from the atmosphere, said second thin diaphragm being frangible by pressure released through said needle when the needle pierces the first said diaphragm.

2. In an instrument having pressure responsive means, the combination comprising a hermetically sealed casing within which said pressure responsive means is housed, said casing having an opening therein, bellows with one end sealed around said opening, the opposite end of the bellows extending inwardly and being sealed by a diaphragm, a plug carried in said opening and having a needle integral therewith extending inwardly with its point in proximity to said diaphragm, a bore extending through said needle and plug to the atmosphere, so that upon leakage or rupture of said pressure responsive means, said bellows will be contracted and said diaphragm pierced by said needle, and a second diaphragm of gold less than about .001 inch in thickness located across said opening outwardly of said plug to shield the same from the atmosphere, said second thin diaphragm being frangible by pressure released through said needle when the needle pierces the first said diaphragm.

3. In an instrument having a pressure responsive means therein, the combination comprising a hermetically sealed casing having a passage for the escape of fluid through the wall of the casing, a first seat in said passage, a second seat of larger diameter in said passage, a boss on the inside of the wall, said boss surrounding a portion of said passage, the passage at this point being threaded, a bellows soldered to said boss and extending inwardly into said casing, a diaphragm closing the inner end of said bellows, a screw plug having an axial passage therethrough, said plug being threaded into the threaded portion of said passage, the outer end of said plug being seated on said first seat, a hollow needle extending axially from said screw plug toward said diaphragm with its hollow portion aligned with said axial passage, a cutting edge on the end of said needle close to said diaphragm, a gold disc less than about .001 inch thick and less than one-half inch in diameter resting on said second seat in said wall passage, and an annular disc having means to closely engage said wall passage to hold said gold disc in place, said gold disc being frangible by pressure released through said needle when the needle pierces the said diaphragm.

References Cited in the file of this patent

UNITED STATES PATENTS

| | | |
|---|---|---|
| 1,435,922 | Hasse | Nov. 21, 1922 |
| 1,588,234 | Kauch et al. | June 8, 1926 |
| 1,880,354 | Mueller | Oct. 4, 1932 |
| 2,317,836 | Weaver | Apr. 27, 1943 |
| 2,564,171 | Page | Aug. 14, 1951 |

FOREIGN PATENTS

| | | |
|---|---|---|
| 717,374 | France | Oct. 19, 1931 |